(12) United States Patent
Fu et al.

(10) Patent No.: US 11,428,874 B2
(45) Date of Patent: Aug. 30, 2022

(54) COMPOSITE CONNECTOR FOR OPTICAL POWER METER

(71) Applicant: LuxNet Corporation, Taoyuan (TW)

(72) Inventors: Chung-Hsin Fu, Taoyuan (TW); Ya-Chuan Lin, Taoyuan (TW)

(73) Assignee: LUXNET CORPORATION, Taoyuan (TW)

( * ) Notice: Subject to any disclaimer, the term of this patent is extended or adjusted under 35 U.S.C. 154(b) by 0 days.

(21) Appl. No.: 17/345,001

(22) Filed: Jun. 11, 2021

(65) Prior Publication Data
US 2021/0396938 A1   Dec. 23, 2021

(30) Foreign Application Priority Data
Jun. 22, 2020 (TW) ................................ 109121031

(51) Int. Cl.
*G02B 6/36* (2006.01)
*G02B 6/38* (2006.01)

(52) U.S. Cl.
CPC ........... *G02B 6/389* (2013.01); *G02B 6/3644* (2013.01); *G02B 6/3805* (2013.01); *G02B 6/3897* (2013.01)

(58) Field of Classification Search
CPC .... G02B 6/389; G02B 6/3644; G02B 6/3805; G02B 6/3897; G02B 6/36; H04B 10/07955
See application file for complete search history.

(56) References Cited

U.S. PATENT DOCUMENTS

| | | | |
|---|---|---|---|
| 10,001,606 B1 * | 6/2018 | Hsieh .................. | G02B 6/4292 |
| 2016/0041344 A1 * | 2/2016 | Wasserbauer ........ | G02B 6/3885 385/76 |
| 2018/0031781 A1 * | 2/2018 | Moriyama ......... | G02B 6/38875 |

* cited by examiner

*Primary Examiner* — Jennifer Doan
(74) *Attorney, Agent, or Firm* — WPAT, PC

(57) ABSTRACT

A composite connector for optical power meter is provided, which includes a fixation base and an active connection base. The fixation base is installed on an optical power meter; the fixation base includes a left hole, a right hole and a central hole. The active connection base includes a bottom plate, an active pin, a first fiber socket and a second fiber socket. The first fiber socket and the second fiber socket are disposed on the bottom plate. The active pin penetrates through the bottom plate and is inserted into the left hole, whereby a first circle, whose center is at the active pin and circumference passes through the first fiber socket as well as the second fiber socket, overlaps a second circle, whose center is at the left hole and circumference passes through the central hole, in the normal direction of the active connection base.

10 Claims, 6 Drawing Sheets

COMPOSITE CONNECTOR FOR OPTICAL POWER METER

CROSS REFERENCE TO RELATED APPLICATION

All related applications are incorporated by reference. The present application is based on, and claims priority from, Taiwan Application Serial Number 109121031, filed on Jun. 22, 2020, the disclosure of which is hereby incorporated by reference herein in its entirety.

TECHNICAL FIELD

The technical field relates to a composite connector, in particular to a composite connector for optical power meter.

BACKGROUND

Optical communication technology needs to transmit signals via an optical fiber, so it is necessary to perform measurement for the optical fiber by an optical power meter in order to measure the energy passing through the optical fiber. However, the connector of currently available optical power meters can connect to only one type of optical fiber connector. Therefore, the user should replace the connector by another one so as to connect the optical power meter to another type of optical fiber connector, which is very inconvenient and would waste a lot of time. Besides, it is very difficult to store these connectors designed for different types of optical fiber connectors. For example, if the user would like to connect an optical power meter to a FC fiber connector while the connector of the optical power meter is designed for a LC fiber connector, the user should replace the connector of the optical power meter by a connector designed for the FC fiber connector. Accordingly, the user needs to frequently replace the connector of the optical power meter in order to perform measurement for different types of optical fibers.

SUMMARY

An embodiment of the disclosure relates to a composite connector for optical power meter, which includes a fixation base and an active connection base. The fixation base is installed on an optical power meter, and has a left hole, a right hole and a central hole. The active connection base includes a bottom plate, an active pin and a first fiber socket and a second fiber socket. The first fiber socket and the second fiber socket are disposed on the bottom plate, and the active pin penetrates through the bottom plate and is inserted into the left hole. In this way, a first circle, whose center is at the active pin, overlaps a second circle, whose center is at the left hole, in a normal direction of the active connection base. The circumference of the first circle passes through the first fiber socket and the second fiber socket, and the circumference of the second circle passes through the central hole.

In one embodiment, the active connection base rotates about the active pin, whereby the first fiber socket is aligned with the central hole in the normal direction of the active connection base, or the second fiber socket is aligned with the central hole in the normal direction of the active connection base.

In one embodiment, the active connection base further includes a first fixation pin. When the first fiber socket is aligned with the central hole in the normal direction of the active connection base, the first fixation pin passes the bottom plate and is inserted into the right hole.

In one embodiment, the active connection base further includes a second fixation pin. When the second fiber socket is aligned with the central hole in the normal direction of the active connection base, the second fixation pin passes the bottom plate and is inserted into the right hole.

In one embodiment, the bottom plate is a circular sector plate.

In one embodiment, the central angle of the bottom plate is an acute angle.

In one embodiment, the length of any one of two sides of the bottom plate is equal to the length of the fixation base.

In one embodiment, the active connection base further includes a first fixation pin and a second fixation pin. The active pin is disposed at the top corner of the bottom plate, and the first fixation pin and the second fixation pin are disposed at the two bottom corners of the bottom plate.

In one embodiment, the bottom plate further includes a top corner base, a first bottom corner base and a second bottom corner base. The active pin is disposed at the top corner base, the first fixation pin is disposed at the first bottom corner base and the second fixation pin is disposed at the second bottom corner base.

In one embodiment, the line segments connecting the active pin, the first fixation pin and the second fixation pin to one another form a triangle.

To sum up, the composite connector for optical power meter in accordance with the embodiments of the disclosure has the following advantages:

(1) In one embodiment of the disclosure, the composite connector for optical power meter has several fiber sockets, which can be respectively connected to optical fiber connectors of different types. Thus, the user can perform measurement for different types of optical fibers without frequently replacing the connector of the optical power meter, which is very convenient in use.

(2) In one embodiment of the disclosure, the composite connector for optical power meter has a special structure design capable of integrating the fixation base with the active connection base, the active pin and the fixation pins. Therefore, the optical sockets of the composite connector can be swiftly switched by rotating the active connection base in order to connect to different types of optical fiber connectors. Accordingly, the composite connector is more efficient in use and easy to store.

(3) In one embodiment of the disclosure, the composite connector is of simple structure by means of proper design, so the composite connector can achieve the desired technical effects without significantly increasing the cost and the size thereof.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The disclosure will become more fully understood from the detailed description given herein below and the accompanying drawings which are given by way of illustration only, and thus are not limitative of the disclosure and wherein.

DETAILED DESCRIPTION

Figure 1:
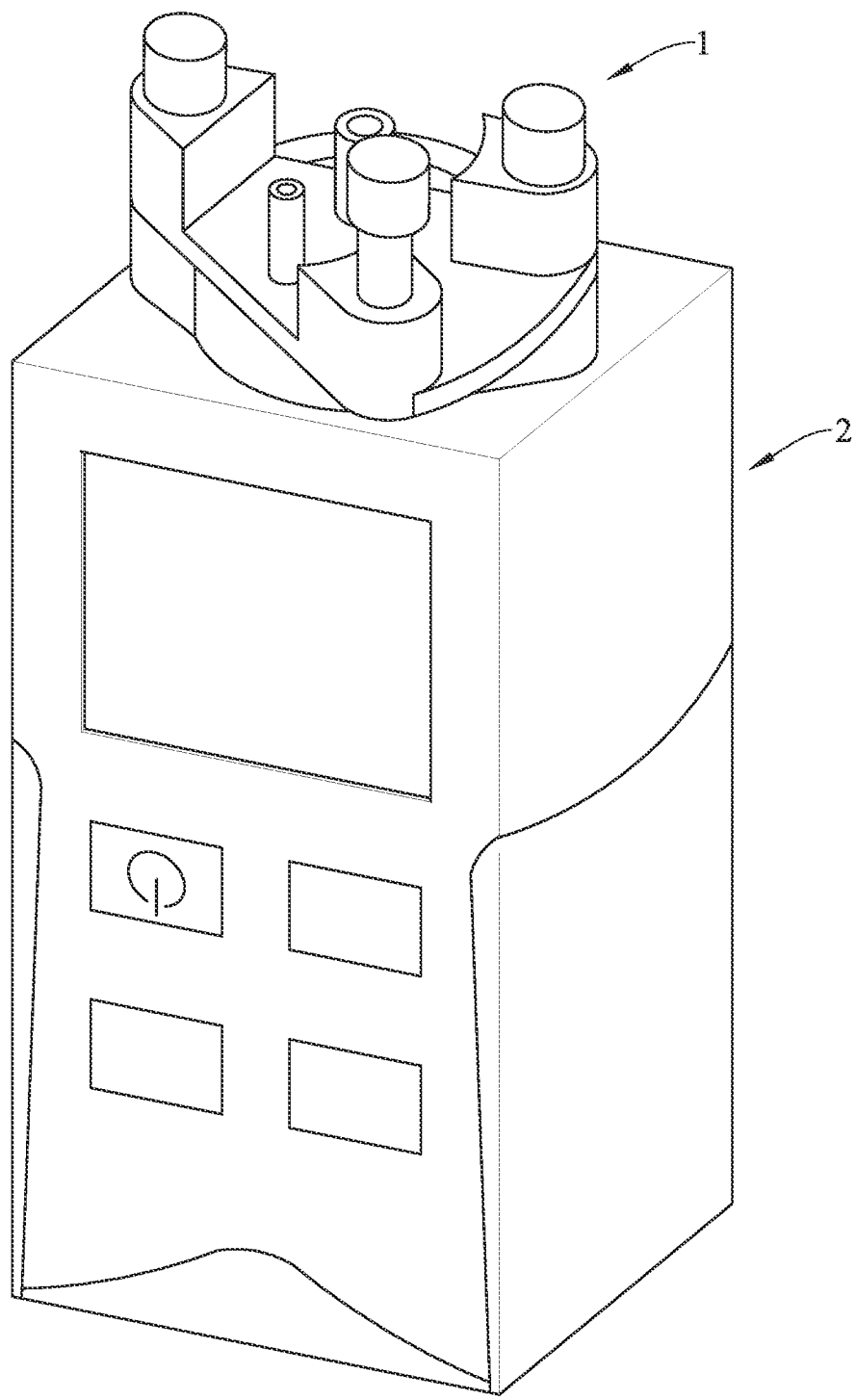
FIG. 1 is a schematic view of a composite connector for optical power meter in accordance with a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Figure 2:
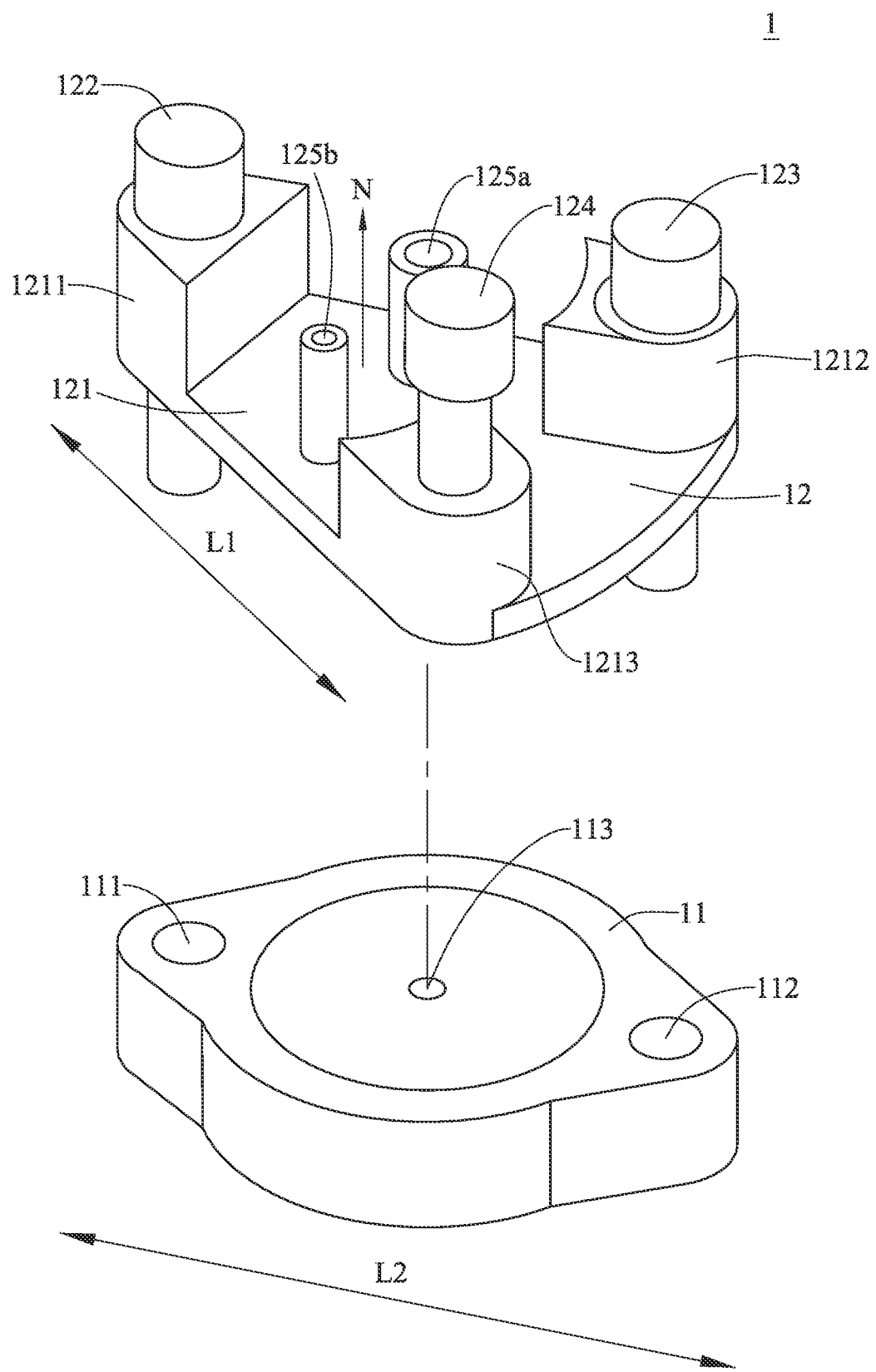
FIG. 2 is an exploded view of the composite connector for optical power meter in accordance with the first embodiment of the disclosure.
Figure 3:
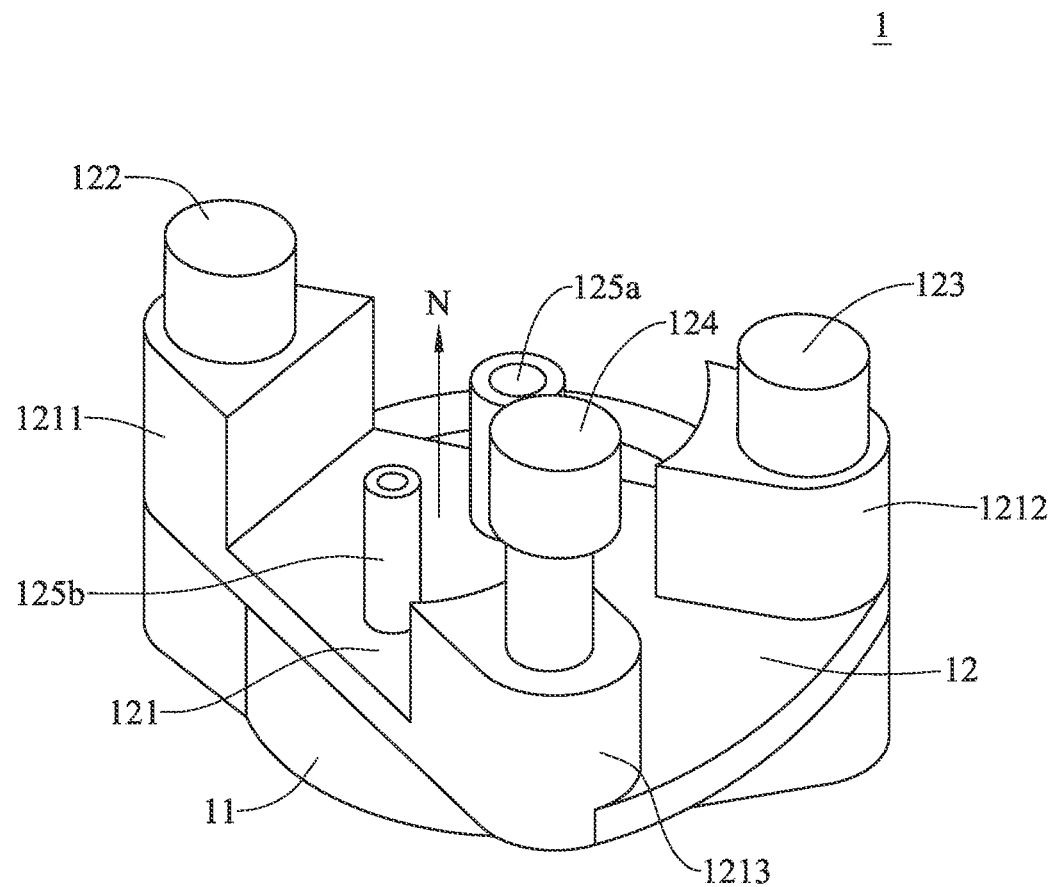
FIG. 3 is a perspective view of the composite connector for optical power meter in accordance with the first embodiment of the disclosure.

Please refer to FIG. 1, FIG. 2 and FIG. 3, which are a schematic view, an exploded view and a perspective view of a composite connector for optical power meter in accordance with a first embodiment of the disclosure. As shown in FIG. 1, the composite connector 1 may be connected to an optical power meter 2.

As shown in FIG. 2 and FIG. 3, the composite connector 1 includes a fixation base 11 and an active connection base 12. The fixation base 11 is installed on the optical power meter 2, and has a left hole 111, a right hole 112 and a central hole 113. The left hole 111 is disposed at one end of the fixation base 22; the right hole 112 is disposed at the other end of the fixation base 11; the central hole 113 is disposed at the center of the fixation base 11 and aligned with the signal input terminal of the optical power meter 2. Besides, as shown in FIG. 1, the fixation base 11 may be fixed on the optical power meter 2 via screws or by other similar ways.

As shown in FIG. 2 and FIG. 3, the active connection base 12 is connected to the fixation base 11. The active connection base 12 includes a bottom plate 121, an active pin 122, a first fixation pin 123, a second fixation pin 124, a first fiber socket 125a and a second fiber socket 125b. The bottom plate 121 may be a circular sector plate and the central angle of the circular sector plate is an acute angle. Besides, the length L1 of any one of the two sides of the bottom plate 121 is equal to the length L2 of the fixation base 11. The bottom plate 121 has a top corner base 1211, a first bottom corner base 1212 and a second bottom corner base 1213. The top corner base 1211, the first bottom corner base 1212 and the second bottom corner base 1213 are disposed at the top corner and the two bottom corners of the sectorial bottom base 121.

The active pin 122 is disposed at the top corner base 1211, which penetrates the bottom plate 121 and is inserted into the left hole 111. The active pin 122 may has the external threads and the top corner base 1211 may also have the internal threads corresponding thereto, such that the active pin 122 can be screwed to the top corner base 1211. In this way, the active connection base 122 can rotate about the active pin 122. In another embodiment, the active pin 122 may also be fixed on the top corner base 1211 by other ways.

The first fixation pin 123 is disposed at the first bottom corner base 1212 and the second fixation pin 124 is disposed at the second bottom corner base 1213, such that the line segments connecting the active pin 122, the first fixation pin 123 and the second fixation pin 124 to one another form a triangle Similarly, the first fixation pin 123 and the second fixation pin 124 may has the external threads, and the first bottom corner base 1212 and the second bottom corner base 1213 may also has the internal threads corresponding thereto. Thus, the first fixation pin 123 and the second fixation pin 124 can be screwed to the first bottom corner base 1212 and the second bottom corner base 1213 respectively. In another embodiment, the first fixation pin 123 and the second fixation pin 124 may also be screwed to the first bottom corner base 1212 and the second bottom corner base 1213 by other ways.

The first fiber socket 125a and the second fiber socket 125b are disposed on the bottom plate 121, and are located between the active pin 122, the first fixation pin 123 and the second fixation pin 124. The first fiber socket 125a can be used to connect to a first optical fiber connector and the second fiber socket 125b can be used to connect to a second optical fiber connector. The type of the first optical fiber connector is different from the type of the second optical fiber connector. In the embodiment, the first optical fiber connector may be a FC fiber connector and the second optical fiber connector may be a LC fiber connector. In another embodiment, the first optical fiber connector and the second optical fiber connector may be other different types of optical fiber connectors. In still another embodiment, the active connection base 12 may has more fiber sockets in order to connect to more different types of optical fiber connectors (e.g. SC fiber connector, FC fiber connector, LC fiber connector, ST fiber connector, APC fiber connector, etc.) in order to satisfy actual requirements.

Figure 4:
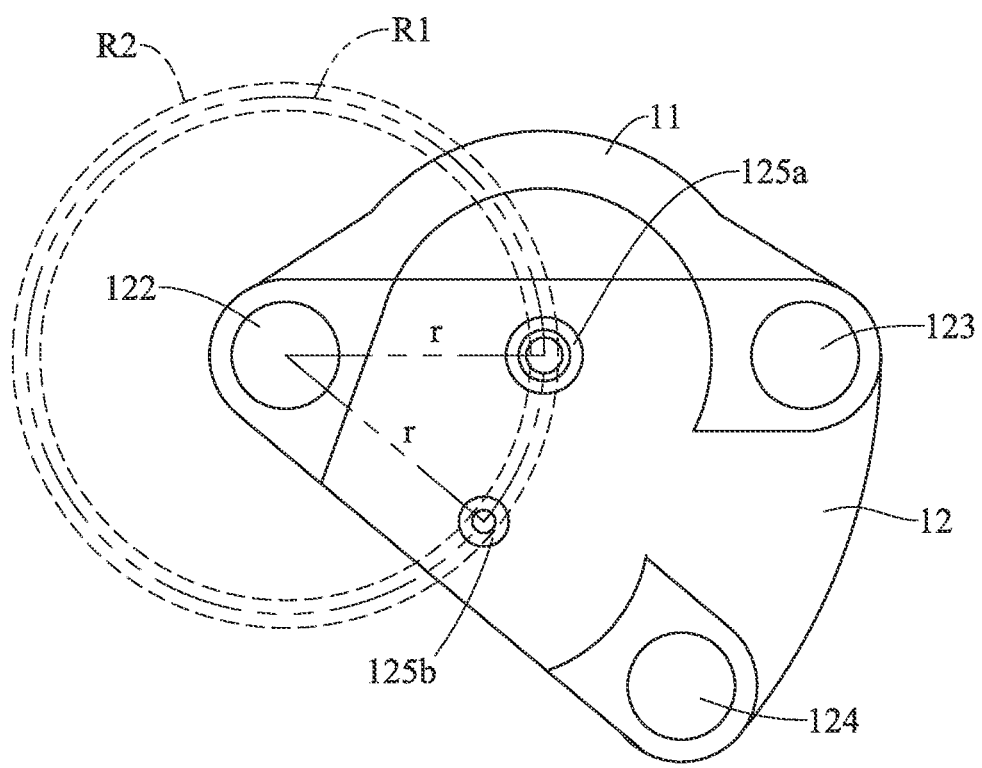
FIG. 4 is a top view of the composite connector for optical power meter in accordance with the first embodiment of the disclosure.

Please refer to FIG. 4, which is a top view of the composite connector for optical power meter in accordance with the first embodiment of the disclosure; please simultaneously refer to FIG. 2 and FIG. 3. As shown in FIG. 4, via the special structure design of integrating the fixation base 11 with the active connection base 12, the first circle R1, whose center is at the active pin 122, overlaps the second circle R2, whose center is at the left hole 111, in the normal direction of the active connection base 12, wherein the circumference of the first circle R1 passes through the first fiber socket 125a and the second fiber socket 125b, and the circumference of the second circle R2 passes through the central hole 113. Accordingly, the distance between the active pin 122 and the first fiber socket 125a and the distance between the active pin 122 and the second fiber socket 125b are equal to the radius r of the first circle R1.

As described above, the active connection base 12 may rotate about the active pin 122. When the active connection base 12 rotates about the active pin 122 to make the first fiber socket 125a be aligned with the central hole 113 in the normal direction of the active connection base 12, the first fiber socket 125a can be also aligned with the signal input terminal of the optical power meter 2. Meanwhile, the first fixation pin 123 can penetrate through the bottom plate 121 and be inserted into the right hole 112 in order to fix the active connection base 12. Therefore, when the first fiber socket 125a is connected to the first optical fiber connector, the light signals of the first optical fiber connector can be inputted into the signal input terminal of the optical power meter 2 so as to perform measurement.

Similarly, when the active connection base 12 rotates about the active pin 122 to make the second fiber socket 125b be aligned with the central hole 113 in the normal direction of the active connection base 12, the second fiber socket 125b can be also aligned with the signal input terminal of the optical power meter 2. Meanwhile, the second fixation pin 124 can penetrate through the bottom plate 121 and be inserted into the right hole 112 in order to fix the active connection base 12. As a result, when the second fiber socket 125b is connected to the second optical fiber connector, the light signals of the second optical fiber connector can be inputted into the signal input terminal of the optical power meter 2 so as to perform measurement.

As set forth above, the composite connector 1 of the optical power meter 2 has the first fiber socket 125a and the second fiber socket 125b for different types of optical fiber connectors and has a special structure capable of swiftly switching between the first fiber socket 125a and the second fiber socket 125b. Therefore, the user can connect the optical power meter 2 with different types of optical fiber connectors to perform measurements for different optical fibers just by switching between the first fiber socket 125a and the second fiber socket 125b, which is more convenient and efficient in use. In addition, the composite connector can is easy to store.

The embodiment just exemplifies the disclosure and is not intended to limit the scope of the disclosure. Any equivalent modification and variation according to the spirit of the disclosure is to be also included within the scope of the following claims and their equivalents.

It is worthy to point out that the connector of currently available optical power meters can connect to only one type of optical fiber connector. Therefore, the user should replace the connector by another one so as to connect the optical power meter to another type of optical fiber connector, which is very inconvenient and would waste a lot of time. Besides, it is very difficult to store these connectors designed for different types of optical fiber connectors. On the contrary, according to one embodiment of the disclosure, the composite connector for optical power meter has several fiber sockets, which can be respectively connected to optical fiber connectors of different types. Thus, the user can perform measurement for different types of optical fibers without frequently replacing the connector of the optical power meter, which is very convenient in use. Moreover, according to one embodiment of the disclosure, the composite connector for optical power meter has a special structure design capable of integrating the fixation base with the active connection base, the active pin and the fixation pins. Therefore, the optical sockets of the composite connector can be swiftly switched by rotating the active connection base in order to connect to different types of optical fiber connectors. Accordingly, the composite connector is more efficient in use and easy to store.

Furthermore, according to one embodiment of the disclosure, the composite connector is of simple structure by means of proper design, so the composite connector can achieve the desired technical effects without significantly increasing the cost and the size thereof. As described above, the composite connector according to the embodiments of the disclosure can actually achieve great technical effects.

Figure 5:
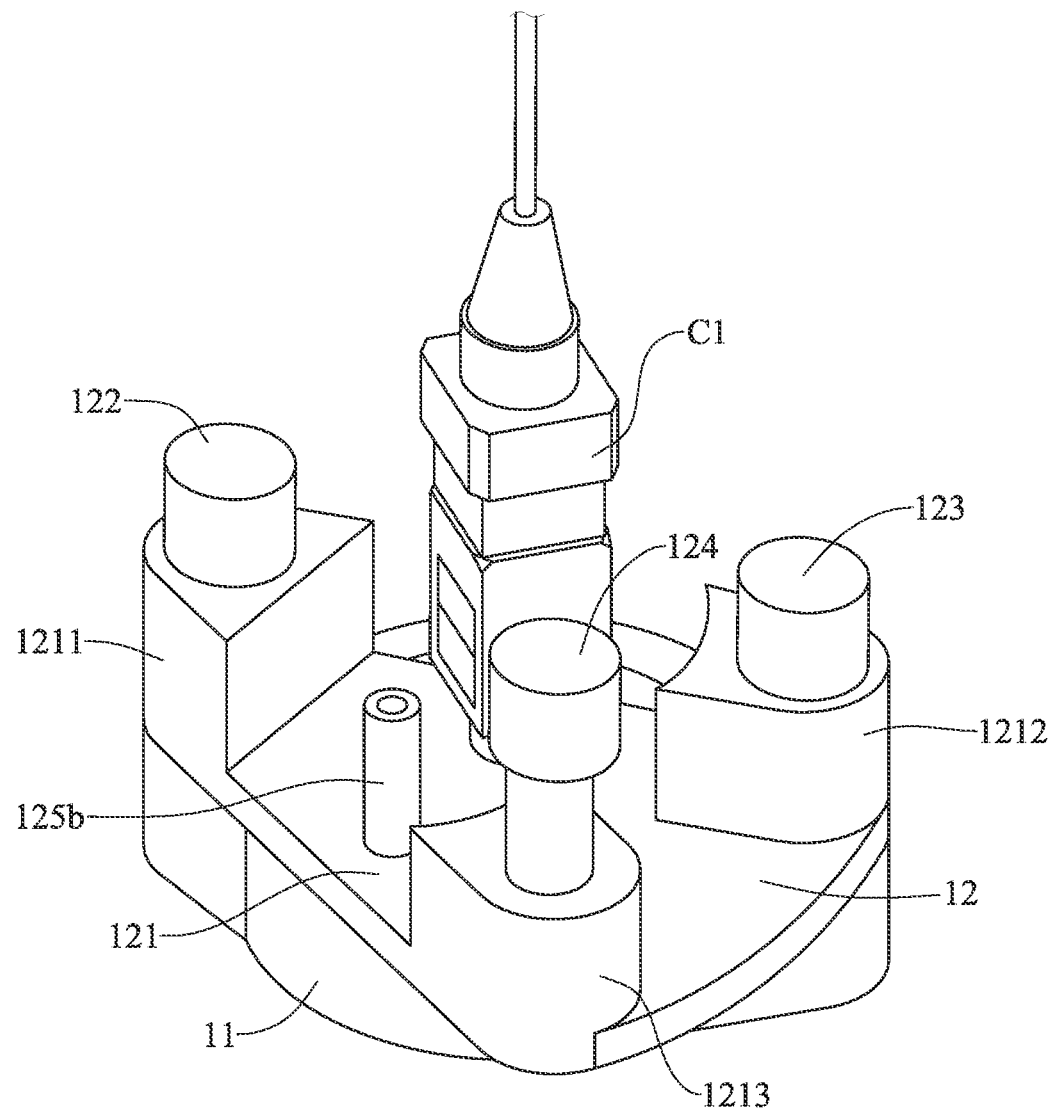
FIG. 5 is a schematic view of a state of use of a composite connector for optical power meter in accordance with a second embodiment of the disclosure.
Figure 6:
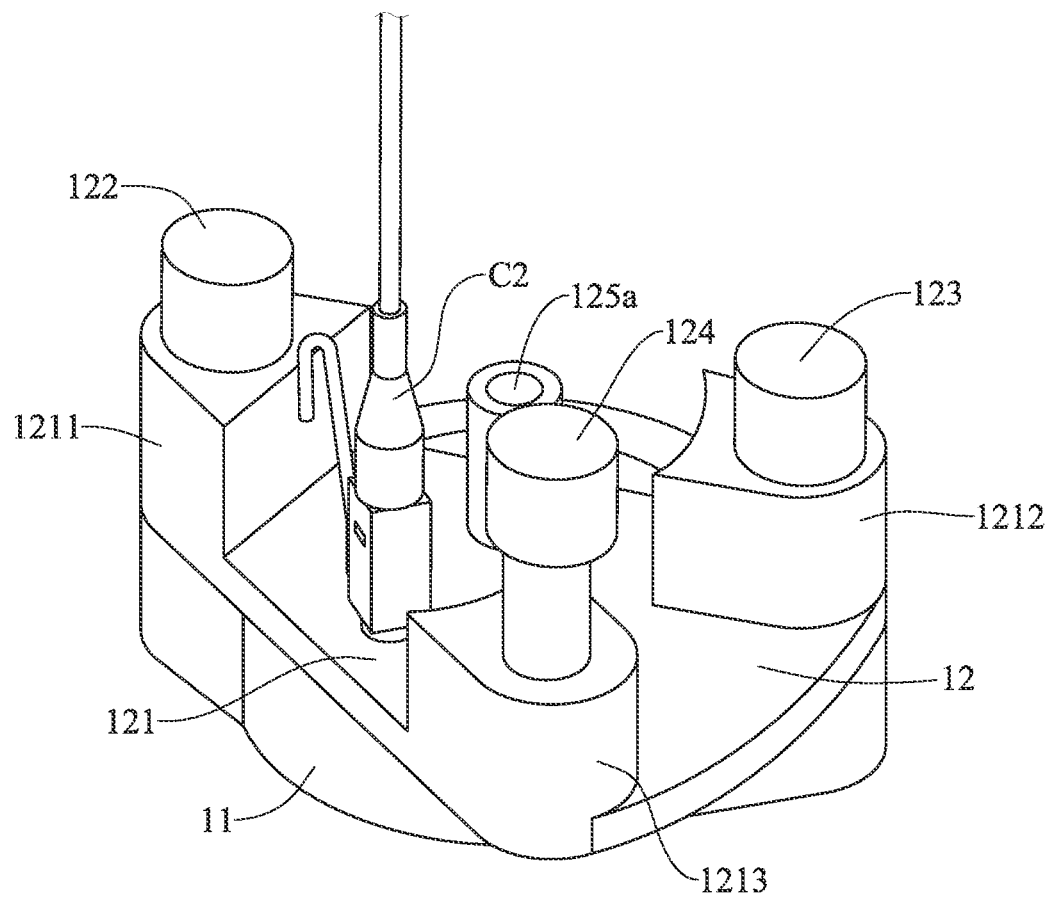
FIG. 6 is a schematic view of another use state of the composite connector for optical power meter in accordance with the second embodiment of the disclosure.

Please refer to FIG. 5 and FIG. 6. FIG. 5 is a schematic view of a state of use of a composite connector for optical power meter in accordance with a second embodiment of the disclosure. FIG. 6 is a schematic view of another use state of the composite connector for optical power meter in accordance with the second embodiment of the disclosure. As shown in FIG. 5, when the active connection base 12 rotates about the active pin 122 until the first fiber socket 125a is aligned with the central hole 113 in the normal direction of the active connection base 12, the first fiber socket 125a is also aligned with the signal input terminal of the optical power meter 2, Then, the first fixation pin 123 can penetrate through the bottom plate 121 in order to fix the active connection base 12. At the moment, the active pin 122, the first fiber socket 125 a and the first fixation pin 213 are arranged in a straight line, so the user can insert the SC fiber connector C1 (or FC fiber connector) into the first fiber socket 125a in order to perform measurement for the fiber.

As shown in FIG. 6, when the active connection base 12 rotates about the active pin 122 until the second fiber socket 125b is aligned with the central hole 113 in the normal direction of the active connection base 12, the second fiber socket 125b is also aligned with the signal input terminal of the optical power meter 2. Then, the second fixation pin 124 penetrates through the bottom plate 121 in order to fix the active connection base 12. Meanwhile, the active pin 122, the second fiber socket 125b and the second fixation pin 214 are arranged in a straight line, so the user can insert the LC fiber connector C2 into the first fiber socket 125b in order to perform measurement for the fiber.

The embodiment just exemplifies the disclosure and is not intended to limit the scope of the disclosure. Any equivalent modification and variation according to the spirit of the disclosure is to be also included within the scope of the following claims and their equivalents.

To sum up, according to one embodiment of the disclosure, the composite connector for optical power meter has several fiber sockets, which can be respectively connected to optical fiber connectors of different types. Thus, the user can perform measurement for different types of optical fibers without frequently replacing the connector of the optical power meter, which is very convenient in use.

Besides, according to one embodiment of the disclosure, the composite connector for optical power meter has a special structure design capable of integrating the fixation base with the active connection base, the active pin and the fixation pins. Therefore, the optical sockets of the composite connector can be swiftly switched by rotating the active connection base in order to connect to different types of optical fiber connectors. Accordingly, the composite connector is more efficient in use and easy to store.

Moreover, according to one embodiment of the disclosure, the composite connector is of simple structure by means of proper design, so the composite connector can achieve the desired technical effects without significantly increasing the cost and the size thereof.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A composite connector for optical power meter, comprising:
   A fixation base installed on an optical power meter, wherein the fixation base has a left hole, a right hole and a central hole; and
   An active connection base comprising a bottom plate, an active pin and a first fiber socket and a second fiber socket;
   wherein the first fiber socket and the second fiber socket are disposed on the bottom plate, and the active pin penetrates through the bottom plate and is inserted into the left hole, whereby a first circle, whose center is at the active pin, overlaps a second circle, whose center is at the left hole, in a normal direction of the active connection base, wherein a circumference of the first circle passes through the first fiber socket and the second fiber socket, and a circumference of the second circle passes through the central hole.

2. The composite connector of claim 1, wherein the active connection base rotates about the active pin, whereby the first fiber socket is aligned with the central hole in the normal direction of the active connection base, or the second fiber socket is aligned with the central hole in the normal direction of the active connection base.

3. The composite connector of claim 2, wherein the active connection base further comprises a first fixation pin, wherein when the first fiber socket is aligned with the central hole in the normal direction of the active connection base, the first fixation pin passes the bottom plate and is inserted into the right hole.

4. The composite connector of claim 3, wherein the active connection base further comprises a second fixation pin, wherein when the second fiber socket is aligned with the central hole in the normal direction of the active connection base, the second fixation pin passes the bottom plate and is inserted into the right hole.

5. The composite connector of claim 1, wherein the bottom plate is a circular sector plate.

6. The composite connector of claim 5, wherein a central angle of the bottom plate is an acute angle.

7. The composite connector of claim 5, wherein a length of any one of two sides of the bottom plate is equal to a length of the fixation base.

8. The composite connector of claim 5, wherein the active connection base further comprises a first fixation pin and a second fixation pin, wherein the active pin is disposed at a top corner of the bottom plate, and the first fixation pin and the second fixation pin are disposed at two bottom corners of the bottom plate.

9. The composite connector of claim 7, wherein the bottom plate further comprises a top corner base, a first bottom corner base and a second bottom corner base, wherein the active pin is disposed at the top corner base, the first fixation pin is disposed at the first bottom corner base and the second fixation pin is disposed at the second bottom corner base.

10. The composite connector of claim 7, wherein line segments connecting the active pin, the first fixation pin and the second fixation pin to one another form a triangle.

* * * * *